H. SNYDER.
SHAFT.
APPLICATION FILED SEPT. 24, 1908.
906,465.
Patented Dec. 8, 1908.
2 SHEETS—SHEET 1.
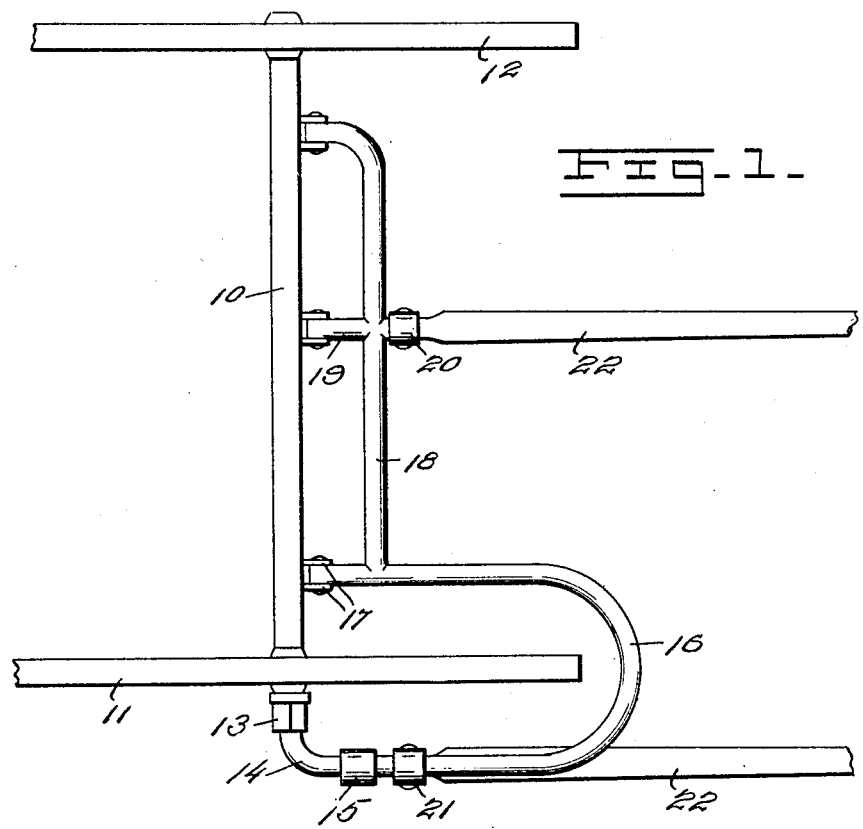
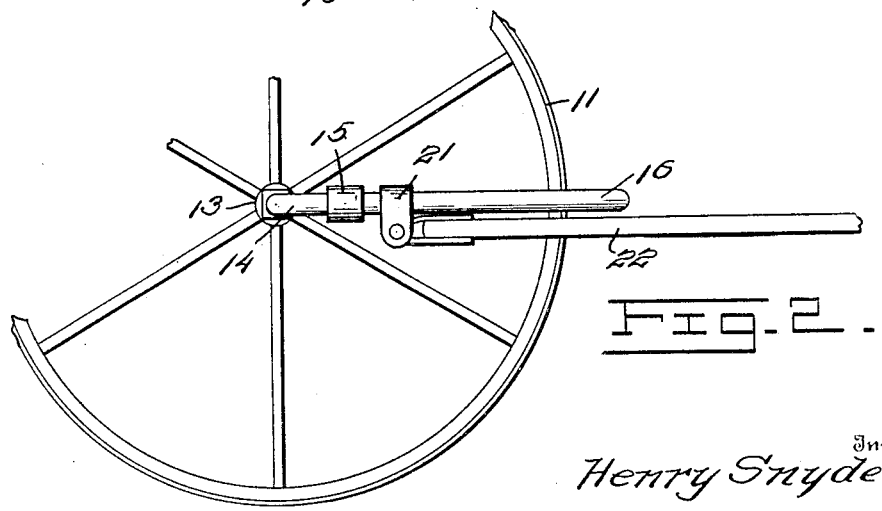
Witnesses
Inventor
Henry Snyder
By Woodward & Chandlee
Attorney H. SNYDER.
SHAFT.
APPLICATION FILED SEPT. 24, 1908.
906,465.
Patented Dec. 8, 1908.
2 SHEETS—SHEET 2.
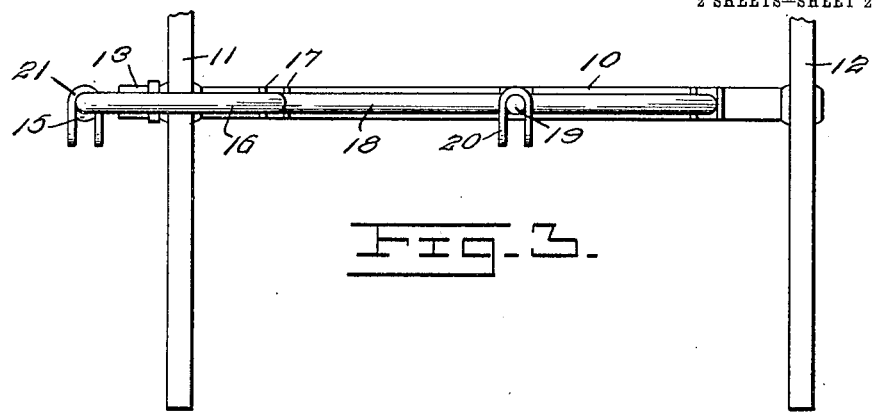
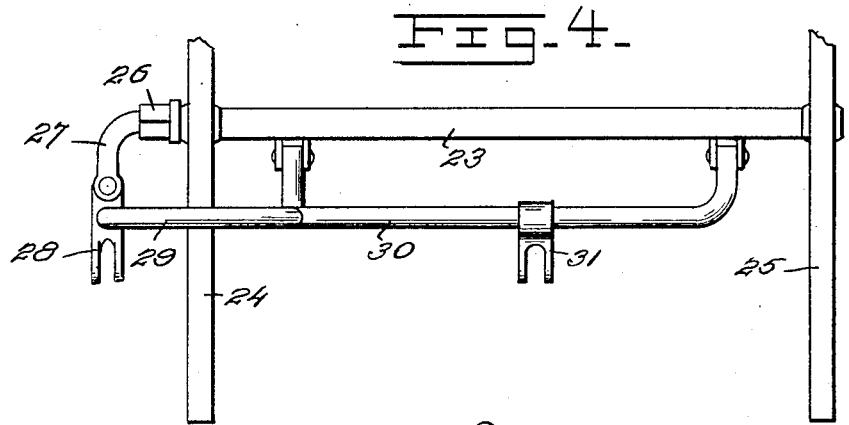
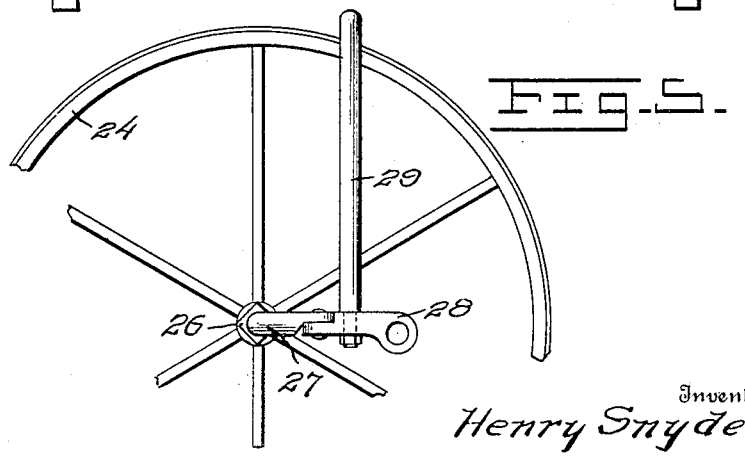
Inventor
Henry Snyder
Witnesses
By Woodward & Chandlee
Attorneys

UNITED STATES PATENT OFFICE.

HENRY SNYDER, OF MARION, SOUTH DAKOTA.

SHAFT.

No. 906,465.  Specification of Letters Patent.  Patented Dec. 8, 1908.

Application filed September 24, 1908. Serial No. 454,544.

*To all whom it may concern:*

Be it known that I, HENRY SNYDER, a citizen of the United States, residing at Marion, in the county of Turner and State of South Dakota, have invented certain new and useful Improvements in Shafts, of which the following is a specification.

This invention relates to carriages and wagons and has special reference to an improved shaft for use upon the same.

An object of this invention is the provision of a shaft which may be applied offset to the wagon so as to permit of the animal drawing the wagon to travel in one of the furrows caused by the passage of wagon wheels over the road.

The invention has for another object the provision of a shaft of this nature which can easily be detached from the wagon and which will permit of easy access to the wheel about which it is disposed.

The invention further designs a device of this character which is simple in construction and economical of manufacture so as to produce an article which will adapt itself more readily to public use than devices of this nature heretofore constructed.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a top plan view of the front axle and wheels of a wagon having the improved shaft applied thereto, Fig. 2 is a side elevation of the same having one of the wheels removed, Fig. 3 is a front elevation of the complete device, Fig. 4 is a top plan view of a modification of the invention, Fig. 5 is a side elevation of the same.

Referring to the drawings, 10 designates the forward axle of a vehicle which is supported at its opposite extremities by the wheels 11 and 12. The axle 10 is provided at the extremity which supports the wheel 11 with a union nut 13 which is engaged over the extremity of the axle 10 and also over the inner end of a curved rod 14 which carries a union coupling 15 at its opposite extremity. Secured in the opposite side of the union coupling 15 is a U shaped brace 16 which extends forwardly about the wheel 11 and engages the axle 10 upon the opposite side thereof where it is secured by ears 17 to the axle 10 and which carries a laterally projecting rod 18 which extends longitudinally of the axle 10 and which is curved inwardly at its opposite extremity where it is secured to the opposite end of the axle 10. Intermediately disposed upon the rod 18 is a cross arm 19 which is secured to the axle 10 at its rear extremity and which extends a slight distance forwardly beyond the rod 18 where a coupling member 20 is rigidly positioned. The U shaped brace 16 is provided with a coupling member 21 adjacent its outer extremity which in conjunction with the coupling member 20 supports the shafts 22. It is thus seen by this construction that one of the shafts 22 is disposed upon the outer side of the wheel 11 while the other shaft 22 is positioned intermediately of the wheels 11 and 12 thus offsetting the shaft to enable the animal drawing the vehicle to travel at one side of the vehicle.

The curved rod 14 is employed for the purpose of quickly detaching or positioning the wheel 11 by means of the removal of the nut 13 and union coupling 15. It is readily seen that by the removal of the members 13 and 15 the curved rod 14 is detached from the axle 10 and the brace 16 which allows a clearance sufficient for the passage and positioning of the wheel 11.

In the modification shown in Fig. 4 the axle 23 of the vehicle supports the wheels 24 and 25 upon its opposite extremities and carries a union nut 26 upon one extremity to secure the wheel 24 in position. The union nut 26 also carries a curved rod 27 which is pivotally connected to a shaft coupling 28. The shaft coupling 28 rigidly carries one extremity of a curved brace 29 which extends upwardly over the wheel 24 and is curved outwardly at its opposite extremity to form a brace rod 30 which is rigidly secured to the axle 23. A second shaft coupling 31 is positioned upon the brace rod 30 intermediately thereof to support the shafts of the wagon.

What is claimed is:—

1. A device of the class described comprising a curved brace secured at its inner end to the axle of a vehicle, a curved rod secured to the outer extremity of said brace, a union nut carried upon the extremity of said curved rod for engagement with the outer extremity of the axle of the vehicle, a brace rod laterally extended from said curved brace and positioned longitudinally of the axle, a cross arm intermediately disposed on said brace rod and shaft couplings mounted upon the forward extremity of said cross arm and the outer end of said curved brace.

2. A device of the class described comprising a U shaped brace, forwardly extended about a wheel of a vehicle and secured to the axle thereof, a laterally extended rod carried by said brace and secured at its opposite ends to the axle of the vehicle, a cross arm intermediately positioned upon said rod and shaft couplings mounted upon said cross arm and said brace for the purpose of pivotally supporting the shafts of the vehicle.

3. A device of the class described comprising a curved rod, a union nut disposed upon said rod and upon the extremity of an axle for supporting said rod, a shaft coupling pivotally disposed upon the forward extremity of said rod, a U shaped brace extended over the adjacent wheel of a vehicle, a brace rod laterally extended from said brace and secured to the axle of a vehicle and a shaft coupling intermediately disposed upon said brace rod.

4. A device of the class described comprising a rod longitudinally disposed upon an axle of a vehicle, a U shaped brace disposed at one extremity of said rod and extended about the wheel of a vehicle, the outer extremity of said brace being secured to the axle of the vehicle and a curved rod mounted between the outer extremity of the brace and the axle of the vehicle for the purpose of allowing the withdrawal of the wheel from the vehicle.

In testimony whereof I affix my signature, in presence of two witnesses.

HENRY SNYDER.

Witnesses:
C. L. JONES,
S. V. JONES.